Figure 1:
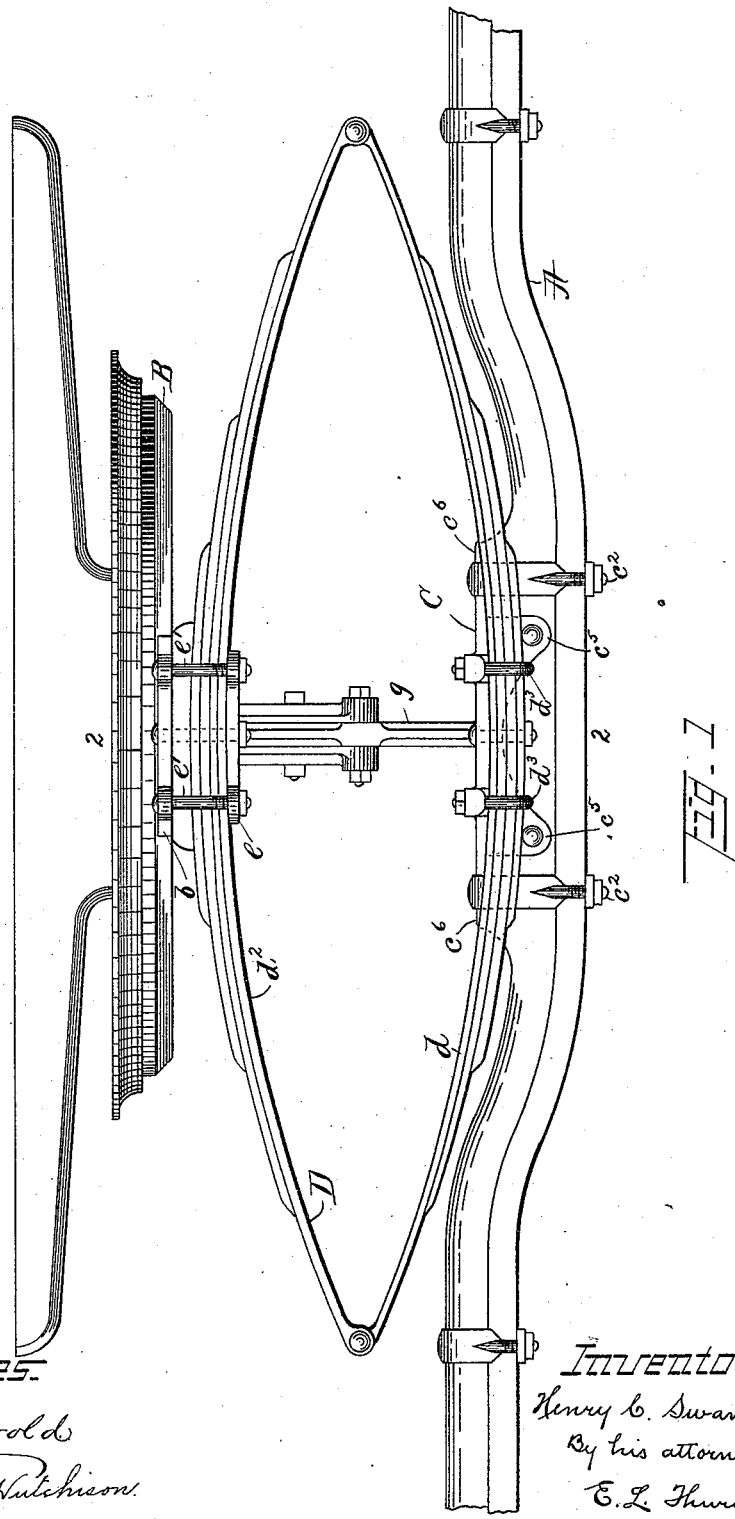

(No Model.) 2 Sheets—Sheet 1.

H. C. SWAN.
VEHICLE RUNNING GEAR.

No. 558,231. Patented Apr. 14, 1896.

Witnesses:
F. Griswold
Helen M. Hutchison.

Inventor:
Henry C. Swan
By his attorney
E. L. Thurston (No Model.) 2 Sheets—Sheet 2.
H. C. SWAN.
VEHICLE RUNNING GEAR.
No. 558,231. Patented Apr. 14, 1896.
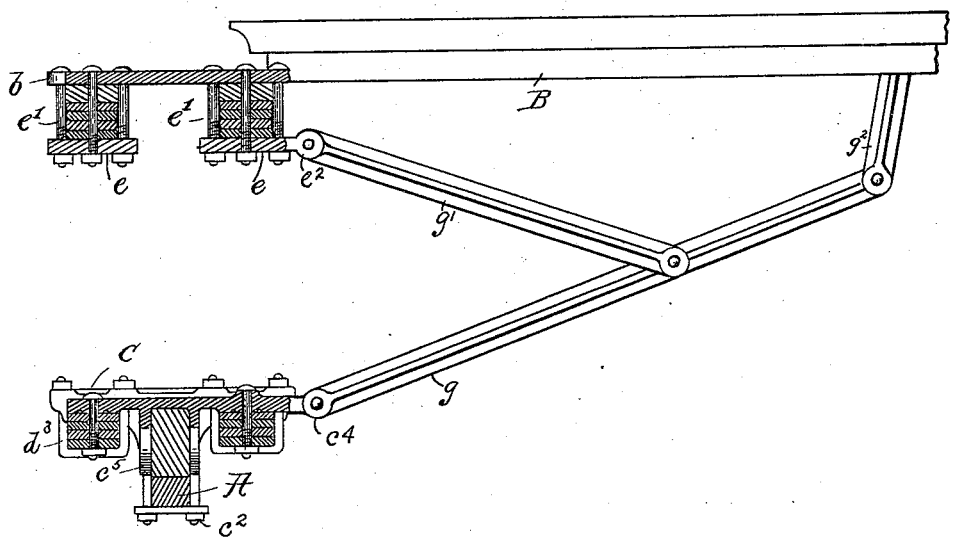
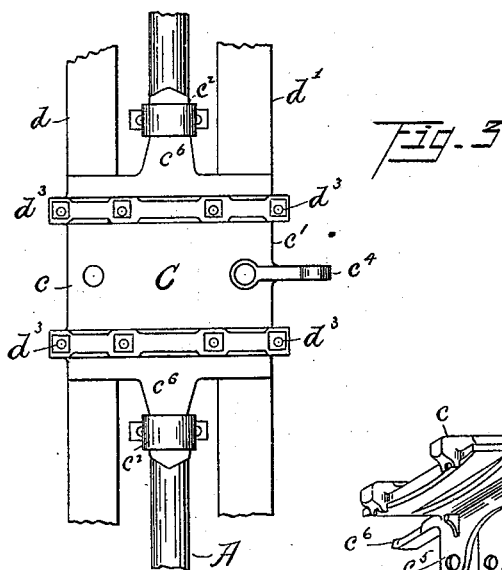
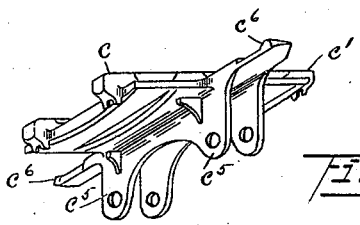
Witnesses.
F. R. Griswold
Helen M. Hutchison
Inventor.
Henry C. Swan
By his attorney
E. L. Thurston

UNITED STATES PATENT OFFICE.

HENRY C. SWAN, OF OSHKOSH, WISCONSIN.

VEHICLE RUNNING-GEAR.

SPECIFICATION forming part of Letters Patent No. 558,231, dated April 14, 1896.

Application filed February 13, 1896. Serial No. 579,164. (No model.)

*To all whom it may concern:*

Be it known that I, HENRY C. SWAN, a citizen of the United States, residing at Oshkosh, in the county of Winnebago and State of Wisconsin, have invented certain new and useful Improvements in Vehicle Running-Gear; and I do hereby declare the following to be a full, clear, and exact description of the invention, such as will enable others skilled in the art to which it appertains to make and use the same.

The principal object of my invention is to provide a construction which includes a full-elliptic duplex spring at front or rear ends thereof, or both, arranged and supported so that the body may set as low and the vehicle turn as short as desirable; and the invention consists in the construction and combination of parts hereinafter described, and particularly pointed out in the claims.

In the drawings, Figure 1 is a front elevation of the front running-gear of a vehicle provided with my invention. Fig. 2 is a sectional view on line 2 2 of Fig. 1. Fig. 3 is a plan view of the middle part of the axle and parts connected therewith, and Fig. 4 is a perspective view of the spring-chair.

Referring to the parts by letters, A represents the axle, the front axle, as shown.

B represents the lower fifth-wheel section.

C represents a spring-chair which rests upon the middle part of the axle, where it may be secured by the clips $c^2$. This spring-chair is provided with projections $c$ and $c'$, which extend, respectively, in front of and behind said axle.

D represents a full-elliptic duplex spring—that is to say, two full-elliptic springs which act together to support the body either directly or through suitable intermediate mechanism. The lower sections $d$ and $d'$ of said duplex spring are secured, respectively, to the forward and rearward extensions $c$ $c'$ of the spring-chair, and, as shown, in order to permit the body to set lower than it otherwise could the springs pass beneath said extensions and are secured thereto by the clips $d^3$.

The upper spring-sections $d^2$ are secured to the body by and through suitable intermediate mechanism. The springs at the front end of the running-gear may be connected with the lower fifth-wheel section B by means of the plate or plates $e$, which pass beneath them, and the bolts $e'$, which clamp the spring between said plates and a plate $b$, which projects forward from the fifth-wheel section B.

The above-described construction is, I believe, the first in which a full-elliptic duplex spring secured to one or both axles supports the body. Half-elliptic duplex springs have been used, and their merits and demerits are well understood; but I am not aware that full-elliptic duplex springs have before been used.

My construction above described has several special points of advantage over prior constructions. In the first place it permits the body to set low, because the middle of the springs need not rest upon a support at the level of the top of the axle. They may pass beneath the forward and rearward projections of the spring-chair, and these projections may obviously be bent down as low as desired. Moreover, the axle at its middle may be bent down as much as desirable, thereby carrying down the spring-chair, and the raised parts of the axle at each side of the depressed part do not interfere with the proper action of the springs, as they would if a single full-elliptic spring were secured on top of the middle part of the axle. Further, the construction described is especially suited for use with fifth-wheel constructions intended to adapt the wagon to turn short—as, for example, that shown in the drawings, in which a link $g$ is pivoted to the axle and extends therefrom rearward, its rear end being supported by a flexible link $g^2$, which is suspended from the lower fifth-wheel section, and a second link $g'$ is pivoted at its front end to the lower fifth-wheel section and at its rear end to the link $g$.

This particular construction of fifth-wheel device forms the subject-matter of another application heretofore filed, and is not, therefore, herein claimed; nor is it, except in one claim, made essential to the present invention. It is herein explained for the reason, principally, that the combination of parts herein claimed as my invention is particularly suited to be used with fifth-wheel devices of this sort, substantially.

When my present invention is used with the particular fifth-wheel shown, the spring-chair is formed with a rearwardly-extended arm $c^4$, to which the link $g$ is pivoted, and the plate $e$ is likewise provided with an arm $e^2$, to which the lever $g'$ is pivoted.

The spring-chair is provided with the downwardly-turned flanges $c^5 c^5$, which lie against and are bolted to opposite sides of the axle, and with the lateral arms $c^6$, which lie upon and are secured to the axle by the clips $c^2$.

Having described my invention, I claim—

1. In vehicle running-gear, the combination of the axle and a spring-chair secured to the axle and having forward and rearward projections, with a full-elliptic duplex spring, the lower sections of which are secured to the forward and rearward projections of said spring-chair, substantially as and for the purpose specified.

2. In vehicle running-gear, the combination of the axle, and a spring-chair secured thereto having forward and rearward projections, with a full-elliptic duplex spring, the lower sections of which pass respectively beneath and are clipped to said forward and rearward projections, substantially as and for the purpose specified.

3. In vehicle running-gear, the combination of the axle, a spring-chair secured thereto and having forward and rearward projections, and a full-elliptic duplex spring, the lower sections of which are secured respectively to the said forward and rearward projections, with the lower section of the fifth-wheel device, a plate and bolts for clamping the upper sections of said duplex spring to said fifth-wheel section, arms projecting rearward from said plate and spring-chair respectively, and the links $g$ $g'$ and $g^2$, substantially as and for the purpose specified.

4. In running-gear for vehicles, the combination of the axle, and a spring-seat having the flanges $c^5 c^5$, the forward and rearward projections $c$ and $c'$, and the lateral extensions $c^6$, with the clips $c^2$, and the two full-elliptic springs the lower sections of which are respectively secured to the forward and rearward projections $c$ $c'$, substantially as and for the purpose specified.

In testimony whereof I affix my signature in presence of two witnesses.

HENRY C. SWAN.

Witnesses:
E. L. THURSTON,
L. F. GRISWOLD.